US010829283B2

(12) United States Patent
Borg et al.

(10) Patent No.: US 10,829,283 B2
(45) Date of Patent: *Nov. 10, 2020

(54) CONTAINER CARRIER WITH FLEXIBLE FLANGE

(71) Applicant: Oregon Precision Industries, Inc., Eugene, OR (US)

(72) Inventors: Zakary James Borg, Eugene, OR (US); Ronald Lee Mellor, Jr., Eugene, OR (US)

(73) Assignee: OREGON PRECISION INDUSTRIES, INC., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,057

(22) Filed: Apr. 19, 2019

(65) Prior Publication Data

US 2019/0241336 A1    Aug. 8, 2019

Related U.S. Application Data

(63) Continuation of application No. 15/449,831, filed on Mar. 3, 2017, now Pat. No. 10,266,326.

(51) Int. Cl.
*B65D 75/00*    (2006.01)
*B65D 71/50*    (2006.01)
(Continued)

(52) U.S. Cl.
CPC ............. *B65D 71/50* (2013.01); *B29C 67/24* (2013.01); *B65D 21/02* (2013.01);
(Continued)

(58) Field of Classification Search
CPC .... B65D 21/02; B65D 21/0233; B65D 71/00; B65D 71/50; B29K 2023/065; B29K 2105/26; B29C 67/24
(Continued)

(56) References Cited

U.S. PATENT DOCUMENTS 3,134,485 A    5/1964    Bonkowski et al.
3,250,564 A    5/1966    Stern et al.
(Continued)

FOREIGN PATENT DOCUMENTS

CL    199100643 A    3/1992
CL    199500263 A    2/1994
(Continued)

OTHER PUBLICATIONS

European Patent Office, Extended European Search Report Issued in Application No. 17179285.6, dated Feb. 1, 2018, Netherlands, 5 pages.

*Primary Examiner* — Luan K Bui
(74) *Attorney, Agent, or Firm* — Alleman Hall Creasman & Tuttle LLP (57) ABSTRACT

A container carrier and manufacturing method for a container carrier are provided. The container carrier includes an integrally molded body with a plurality of annular structures connected by a bridges. The annular structures each include a side wall formed of side wall portions separated by side wall voids and a top surface. Flanges are positioned at the bottom of each side wall void to collectively engage the containers. The flanges are configured to project inwardly and orient upwardly at an angle so as to flex when accepting or releasing a container. The top surfaces of the annular structures include notched voids continuous with respective side wall voids such that the flanges positioned at the bottoms of the side wall voids are accommodated by the notched voids in the top surface of a second, same-shaped container carrier when stacked.

18 Claims, 8 Drawing Sheets

(51) Int. Cl.
  *B65D 21/02*   (2006.01)
  *B29C 67/24*   (2006.01)
  *B65D 71/00*   (2006.01)
  B29K 23/00     (2006.01)
  B29K 105/26    (2006.01)
  B29L 31/00     (2006.01)

(52) U.S. Cl.
  CPC ......... *B65D 21/0233* (2013.01); *B65D 71/00* (2013.01); *B29K 2023/065* (2013.01); *B29K 2105/26* (2013.01); *B29L 2031/7178* (2013.01)

(58) Field of Classification Search
  USPC ....... 206/139, 145, 147, 148, 150, 151, 563, 206/564; 264/219, 225; 229/406, 407, 229/904; 294/87.2, 87.28
  See application file for complete search history.

(56) References Cited

U.S. PATENT DOCUMENTS

| | | | |
|---|---|---|---|
| 3,302,854 A | 2/1967 | Midgley et al. | |
| 4,139,094 A | 2/1979 | Berry et al. | |
| 4,360,231 A | 11/1982 | Bolin | |
| 4,523,677 A | 6/1985 | Schurmann | |
| 4,718,555 A * | 1/1988 | Amberg | B65D 1/36 206/518 |
| 5,096,065 A * | 3/1992 | Vigue | B65D 1/36 206/564 |
| 5,713,619 A * | 2/1998 | DuBois | A47G 23/06 206/519 |
| 6,398,056 B1 * | 6/2002 | Letourneau | B65D 71/70 206/564 |
| 6,679,380 B2 * | 1/2004 | Brown | A47G 23/0641 206/427 |
| 6,789,828 B1 | 9/2004 | Borg | |
| 7,225,927 B2 * | 6/2007 | Sweeney | B65D 1/36 206/564 |
| 7,588,275 B2 | 9/2009 | Borg | |
| 7,614,495 B1 | 11/2009 | Smithers | |
| 7,762,396 B1 * | 7/2010 | Yang | B65D 1/36 206/427 |
| 8,607,984 B2 * | 12/2013 | Breton | B65D 1/36 206/427 |
| D722,891 S | 2/2015 | Borg et al. | |
| 2005/0133386 A1 | 6/2005 | Wong | |
| 2007/0296231 A1 | 12/2007 | Borg | |
| 2008/0224489 A1 | 9/2008 | Borg | |
| 2010/0025360 A1 | 2/2010 | Borg | |
| 2010/0301077 A1 | 12/2010 | Robertson et al. | |
| 2011/0120995 A1 * | 5/2011 | Landry | B65D 1/36 220/23.8 |
| 2011/0252824 A1 | 10/2011 | Dallas et al. | |
| 2012/0073997 A1 | 3/2012 | Borg | |
| 2013/0068635 A1 * | 3/2013 | Ralph | B65D 5/4608 206/139 |
| 2015/0210428 A1 | 6/2015 | Borg et al. | |
| 2018/0251261 A1 | 9/2018 | Borg et al. | |

FOREIGN PATENT DOCUMENTS

| | | |
|---|---|---|
| EP | 1970323 A1 | 9/2008 |
| FR | 2898589 A1 | 9/2007 |
| WO | 9522495 A1 | 8/1995 |
| WO | 03035493 A1 | 5/2003 |
| WO | 2011138788 A1 | 11/2011 |
| WO | 2011147020 A1 | 12/2011 |

\* cited by examiner

FIG. 11D

CONTAINER CARRIER WITH FLEXIBLE FLANGE

CROSS-REFERENCE TO RELATED APPLICATIONS

This application is a continuation of U.S. patent application Ser. No. 15/449,831, filed Mar. 3, 2017 and entitled CONTAINER CARRIER WITH FLEXIBLE FLANGE, the disclosure of which is hereby incorporated by reference in its entirety for all purposes.

BACKGROUND

Container carriers are used in retail environments to secure a group of containers so that they may be grasped and carried as a single unit. This configuration is advantageous to a user who desires to transport several containers at once, such as cans or bottles of beverages. Heavier products, such as liquids, may require three-dimensional container carriers to support their weight. Additionally, products with caps, such as bottles, may need a taller container carrier to accommodate the caps. Such container carriers must engage the products securely but also allow them to be easily released by a user. With current solutions, users often experience difficulty releasing a container from a container carrier, which may result in frustration and compromise the integrity of the product.

SUMMARY

To address the above issues, a container carrier and manufacturing method for a container carrier are disclosed herein. According to a first aspect, a container carrier for securing together and carrying multiple containers is provided comprising an integrally molded body that includes a plurality of annular structures. Each annular structure is connected by a bridge to at least one adjacent annular structure of the plurality of annular structures. Each annular structure includes a side wall formed of side wall portions and a top surface connecting the side wall portions. The side wall portions are separated by side wall voids formed in the side wall. A respective flange is positioned proximate a bottom end of each side wall void. The flanges of each annular structure are collectively configured to releasably engage a corresponding container of the multiple containers. To this end, the flanges project inwardly and orient upwardly at an angle and are configured to flex when accepting or releasing a corresponding container of the multiple containers. The top surface connecting the side wall portions of each annular structure includes notched voids continuous with respective side wall voids. As such, the flanges positioned proximate the bottom ends of each side wall void may be accommodated by the notched voids in the top surface of a second, same-shaped container carrier when stacked. The flanges are configured to have a perimeter profile as viewed from above that is smaller and nests within a perimeter profile as viewed from above of the notched voids in the top surface. Potential advantages of this configuration are that the flanges do not inhibit efficient stacking of the container carriers and that multiple containers may be securely transported in one carrier yet individually removed with ease from the container carrier.

In this aspect, each side wall portion has a respective upper side wall segment and a respective lower side wall segment. The upper side wall segment has a reduced diameter relative to the lower side wall segment of the side wall portion. The upper and lower side wall segments are configured to join at a horizontally extending ledge that spans a difference between the respective diameters in the upper and lower side wall segments. A potential advantage of this configuration is that the container carriers are shaped to nest together when stacked, which allows for more efficient packing and shipping of container carriers in comparison to currently available solutions.

In this aspect, the bottom portion of the lower side wall segment is shaped to have an inner diameter that is larger than an outer diameter of the upper side wall and smaller than an outer diameter of the ledge. As such, the bottom portion of the lower side wall segment will rest upon the ledge of a second, same-shaped container carrier when stacked. A potential advantage of this configuration is that the container carriers nest snuggly together when stacked to minimize lateral shifting of the stock while in shipping containers, thereby reducing the potential of damaging the container carriers during transit.

In this aspect, each bridge between adjacent annular structures may be defined by a top surface that is connectively formed between adjacent annular structures, an inner side wall portion, and an outer side wall portion. Each of the inner and outer side wall portions may have a respective upper side wall segment that has a reduced width relative to a lower side wall segment of the side wall portion. The upper and lower side wall segments may be joined at a horizontally extending ledge that spans a difference between respective widths in the upper and lower side wall segments. Potential advantages of this configuration are that the bridge structure increases stability of the container carrier, and this configuration allows the bottom of the lower side wall segment of a bridge to rest upon the ledge of a bridge of a second, same-shaped container carrier when stacked.

In this aspect, an integrally formed graspable loop may extend from a bottom of a lower side wall segment of an inner side wall portion of a bridge to a bottom of a lower side wall segment of an inner side wall portion of an opposite bridge. A peak height of the graspable loop may extend beyond the top surfaces of the annular structures and bridges. Potential advantages of this configuration are that a user may easily grasp the loop, and the integral formation of the loop provides increased strength and durability.

In this aspect, the ends of the flanges may be rounded. A potential advantage of this configuration is that the flanges could releasably engage containers having tamper-resistant films or wraps around their caps without damaging the tamper-resistant seal.

In this aspect, the angle of inclination of the flanges from horizontal may be greater than zero and less than 45 degrees, and the angle of inclination of the flanges from horizontal is preferably greater than 10 and less than 30 degrees. A potential advantage of this configuration is that the angle of inclination of the flanges from horizontal will allow the flanges to collectively engage a container and secure it within the annular structure of the container carrier.

In this aspect, the side wall portions may be tapered such that the upper side wall segment has a smaller width relative to the width of the lower side wall segment. A potential advantage of this configuration is that the side wall voids between the side wall portions are inversely tapered to allow the flanges to smoothly nest into a second same-shaped container carrier when stacked.

In this aspect, the plurality of annular structures may be one of two, three, four, six, or eight annular structures. A potential advantage of this configuration is that the container carrier may be customized as desired to hold different numbers of containers.

In this aspect, the container carrier may be formed of a flexible plastic. Potential advantages of this configuration are that the container carrier is lightweight yet durable and may be recycled after use, and further the flanges of the container carrier may flexibly deform to secure and release containers therein.

In another aspect, a manufacturing method for a container carrier for securing together and carrying multiple containers by the necks is provided. The manufacturing method includes molding an integrally formed body that includes a plurality of annular structures. Each annular structure is connected by a bridge to at least one adjacent annular structure of the plurality of annular structures. The method further includes forming a side wall in each annular structure. The side wall is formed of side wall portions separated by side wall voids formed in the side wall. A top surface connects the side wall portions. The manufacturing method further includes forming a respective flange proximate a bottom end of each side wall void. The flanges of each annular structure are collectively configured to releasably engage a corresponding container of the multiple containers. To this end, the flanges project inwardly and orient upwardly at an angle and are configured to flex when accepting or releasing a corresponding container of the multiple containers. The top surface connecting the side wall portions of each annular structure includes notched voids continuous with respective side wall voids. As such, the flanges positioned proximate the bottom ends of each side wall void may be accommodated by the notched voids in the top surface of a second, same-shaped container carrier when stacked. The flanges are configured to have a perimeter profile as viewed from above that is smaller and nests within a perimeter profile as viewed from above of the notched voids in the top surface. Potential advantages of this configuration are that the flanges do not inhibit efficient stacking of the container carriers and that multiple containers may be securely transported in one carrier yet individually removed with ease from the container carrier.

In this aspect, each side wall portion has a respective upper side wall segment and a respective lower side wall segment. The upper side wall segment has a reduced diameter relative to the lower side wall segment of the side wall portion. The upper and lower side wall segments are configured to join at a horizontally extending ledge that spans a difference between the respective diameters in the upper and lower side wall segments. A potential advantage of this configuration is that the container carriers are shaped to nest together when stacked, which allows for more efficient packing and shipping of container carriers in comparison to currently available solutions.

In this aspect, the bottom portion of the lower side wall segment is shaped to have an inner diameter that is larger than an outer diameter of the upper side wall and smaller than an outer diameter of the ledge. As such, the bottom portion of the lower side wall segment will rest upon the ledge of a second, same-shaped container carrier when stacked. A potential advantage of this configuration is that the container carriers nest snuggly together when stacked to minimize lateral shifting of the stock while in shipping containers, thereby reducing the potential of damaging the container carriers during transit.

In this aspect, each bridge between adjacent annular structures may be defined by a top surface that is connectively formed between adjacent annular structures, an inner side wall portion, and an outer side wall portion. Each of the inner and outer side wall portions may have a respective upper side wall segment that has a reduced width relative to a lower side wall segment of the side wall portion. The upper and lower side wall segments may be joined at a horizontally extending ledge that spans a difference between respective widths in the upper and lower side wall segments. Potential advantages of this configuration are that the bridge structure increases stability of the container carrier, and this configuration allows the bottom of the lower side wall segment of a bridge to rest upon the ledge of a bridge of a second, same-shaped container carrier when stacked.

In this aspect, an integrally formed graspable loop may extend from a bottom of a lower side wall segment of an inner side wall portion of a bridge to a bottom of a lower side wall segment of an inner side wall portion of an opposite bridge. A peak height of the graspable loop may extend beyond the top surfaces of the annular structures and bridges. Potential advantages of this configuration are that a user may easily grasp the loop, and the integral formation of the loop provides increased strength and durability.

In this aspect, the ends of the flanges may be rounded. A potential advantage of this configuration is that the flanges could releasably engage containers having tamper-resistant films or wraps around their caps without damaging the tamper-resistant seal.

In this aspect, the angle of inclination of the flanges from horizontal may be greater than zero and less than 45 degrees, and the angle of inclination of the flanges from horizontal is preferably greater than 10 and less than 30 degrees. A potential advantage of this configuration is that the angle of inclination of the flanges from horizontal will allow the flanges to collectively engage a container and secure it within the annular structure of the container carrier.

In this aspect, the side wall portions may be tapered such that the upper side wall segment has a smaller width relative to the width of the lower side wall segment. A potential advantage of this configuration is that the side wall voids between the side wall portions are inversely tapered to allow the flanges to smoothly nest into a second same-shaped container carrier when stacked.

In this aspect, the plurality of annular structures may be one of two, three, four, six, or eight annular structures. A potential advantage of this configuration is that the container carrier may be customized as desired to hold different numbers of containers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Figure 1:
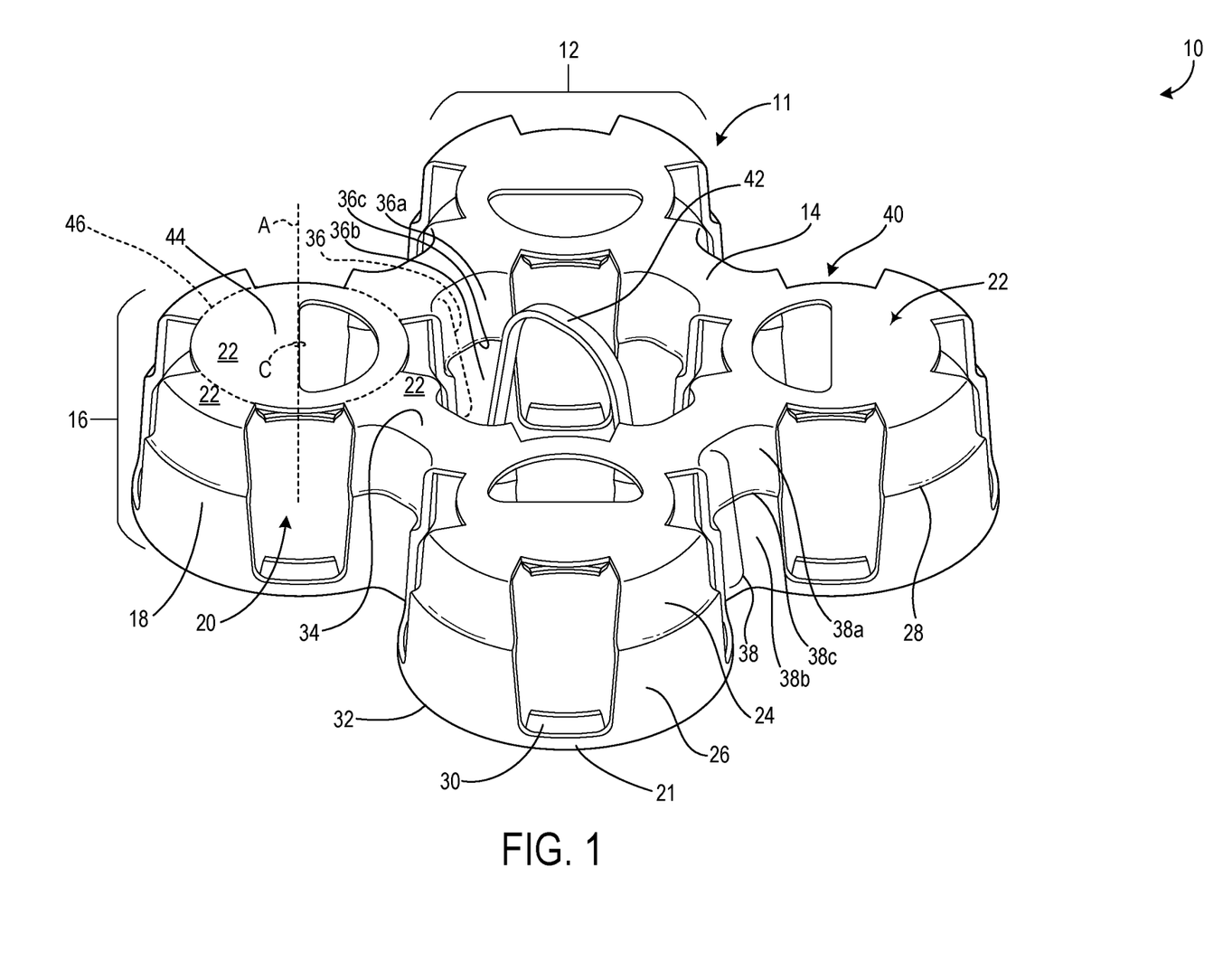
FIG. 1 shows a top perspective view of a container carrier according to one embodiment of the present description.

Turning to the figures, FIG. 1 illustrates one embodiment of a container carrier 10 configured to secure together and carry multiple containers at one time. The body 11 of the container carrier 10 may be integrally molded and may include at least a plurality of annular structures 12. Each annular structure 12 may be connected to at least one adjacent annular structure 12 by a bridge 14.

Figure 5:
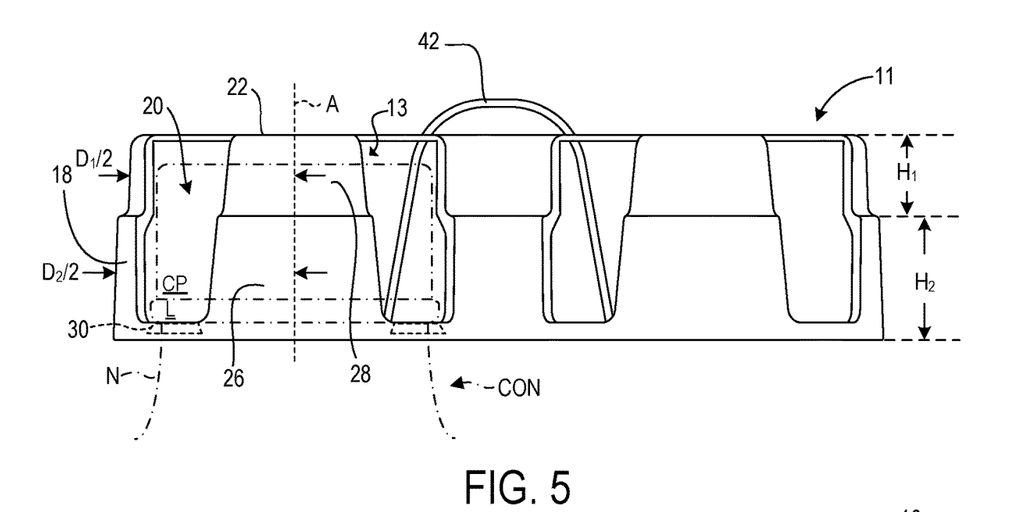
FIG. 5 shows a front view of the container carrier of FIG. 1, wherein the back view is an identical image thereof.

The annular structures 12 may each comprise a side wall 16 formed by side wall portions 18 that are separated by side wall voids 20 formed in the side wall 16. A top surface 22 may connect the side wall portions 18. Each annular structure 12 is formed in a generally circular shape (i.e., circular except where intersecting bridges 14) centered on a vertical central axis A running through a center C of the top surface 22. The side wall portions 18 are formed to be arcuate shapes of revolution around the central axis A. Each side wall portion 18 may be configured to include an upper side wall segment 24 and a lower side wall segment 26. Turning briefly to FIG. 5, the upper side wall segment 24 may have a reduced diameter $D_1$ relative to a diameter $D_2$ of the lower side wall segment 26 of the side wall portion 18, the diameters being measured relative to the central axis A. The upper and lower side wall segments 24, 26 may be joined at a horizontally or diagonally extending ledge 28. The ledge 28 may span the difference between the respective diameters $D_1$, $D_2$ of the upper and lower side wall segments 24, 26. Ledge 28 is formed in the side wall portions 18 around the perimeter of the annular structures 12, and a similarly constructed ledge 36c is formed in the inner and outer side wall portions 36, 38 of bridges 14, as described in detail below.

Referring back to FIG. 1, the bridges 14 connecting the annular structures 12 may each be defined by a top surface 34 that is connectively formed between adjacent annular structures 12, an inner side wall portion 36, and an outer side wall portion 38. In the illustrated embodiment, the top surface of the bridge 34 is formed in the same plane with the top surfaces 22 of the adjacent annular structures 12. Alternatively, the top surface of the bridge 34 may be formed in a parallel plane above or below the top surfaces 22 of the adjacent annular structures 12.

Similar to the side wall portions 18 of the annular structures 12, the inner and outer side wall portions 36, 38 of the bridges 14 may each have an upper side wall segment 36a, 38a and a lower side wall segment 36b, 38b. As illustrated in the top view of the container carrier in FIG. 3, a width $BW_1$ of the bridge at the upper side wall segments 36a, 38a may be reduced in relation to a width $BW_2$ of the bridge at respective lower side wall segments 36b, 38b. Returning to FIG. 1, on both the inner and outer side wall portions 36, 38 of the bridges 14, the upper side wall segments 36a, 38a and lower side wall segments 36b, 38b may be joined at a horizontally or diagonally extending ledge 36c, 38c that spans a difference between respective widths $BW_1$, $BW_2$ of the bridge at the upper side wall segments 36a, 38a and the lower side wall segments 36b, 38b.

Continuing with to FIG. 1, the side wall voids 20 may be formed in at least one of three ways: between two side wall portions 18, between a side wall portion 18 and a bridge 14, or between two bridges 14, as shown. Each side wall void 20 is bordered on the bottom side by an arcuate segment 21 connecting the adjacent lower side wall segments 26 or lower side wall segments of the bridges 36b, 38b. In the present embodiment, each annular structure 12 includes four side wall voids 20, one formed between two side wall portions 18, one formed between two bridges 14, and two formed between a side wall portion 18 and a bridge 14. Alternatively, each annular structure 12 may have more or less than four side wall voids 20 formed in various manners.

Figure 2:
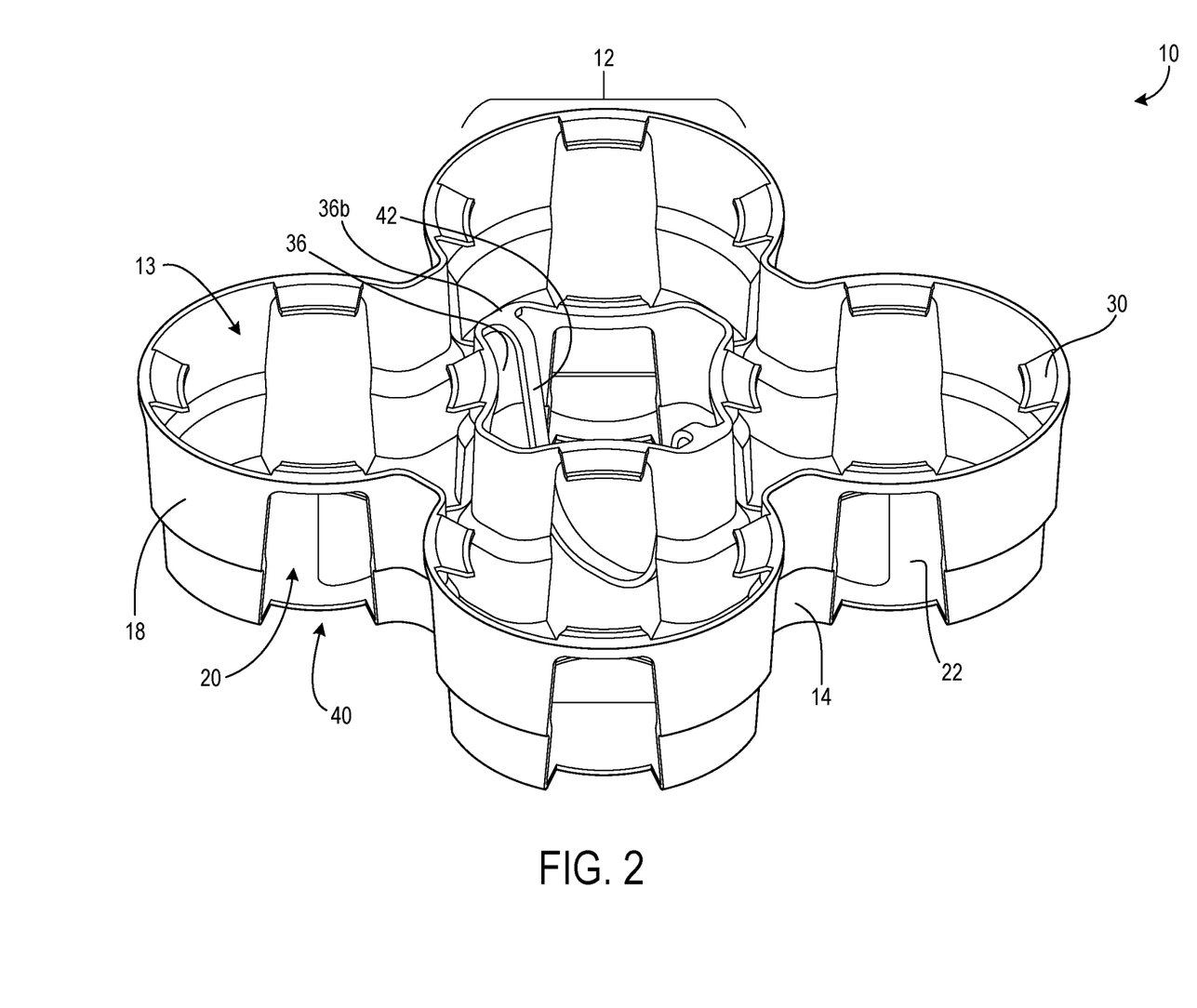
FIG. 2 shows a bottom perspective view of the container carrier of FIG. 1.

As shown in FIG. 2, the top surface 22 of the container carrier 10 that connects the side wall portions 18 of each annular structure 12 may include notched voids 40 that communicate with an internal void 13 of the annular structure 12. These notched voids 40 may be continuous with the respective side wall voids 20, forming a single continuous void. In the nomenclature of this application, notched voids 40 refer to the voids created by the notches in the top surface 22 as best viewed from the top such as in FIG. 3, while side wall voids 20 refer to the voids in the side wall portions as best viewed from the side such as in FIGS. 5 and 6, and these voids 20, 40 communicate with each other and with the internal void 13. As best viewed in FIG. 3, an inner perimeter of the notched voids 40 may be formed in an arcuate shape centered on center C, and sides of the notched voids 40 may be formed substantially along radially extending lines extending from the center C. Like the side wall voids 20, the notched voids 40 may be formed in at least one of three ways: between two side wall portions 18, between a side wall portion 18 and a bridge 14, or between two bridges 14. Because the notched voids 40 are formed continuously with respective side wall voids 20, the number of notched voids 40 in each annular structure 12 will be the same as the number of side wall voids 20. In the illustrated embodiment, one notched void 40 is formed between two side wall portions 18, one notched void 40 is formed between two bridges 14, and two notched voids 40 are formed between a side wall portion 18 and a bridge 14.

Turning back to FIG. 1, a flange 30 may be positioned proximate the bottom end of each side wall void 20. The base of each flange 30 connects to the body 11 of the container carrier 10 at an arcuate segment 21 bordering the bottom of a side wall void 20. Each annular structure 12 may include a plurality of flanges 30, which are collectively configured to releasably engage a corresponding container of the multiple containers. In the present embodiment, four flanges 30 are provided in each annular structure 12, but it will be appreciated that the number of flanges 30 in the annular structures 12 may be more or less than illustrated, so long as their shape and position is sufficient to releasably secure a container. For example, annular structures 12 that have six side wall voids 20 may have six corresponding flanges 30. In other examples, three flanges positioned equidistantly around the inner perimeter of the annular structure may be used, or two wide flanges may be used positioned 180 degrees opposite each other. Flanges 30 may alternately be formed on the interior of lower side wall segments 26 of side wall portions 18 or on the interior of lower side wall segments of the bridges 36b, 38b. Additionally, more than one flange 30 may be present at any one of an arcuate segment 21, the interior of a lower side wall segment 26, or the interior of an inner or an outer lower side wall segment of a bridge 36b, 38b.

Figure 9:
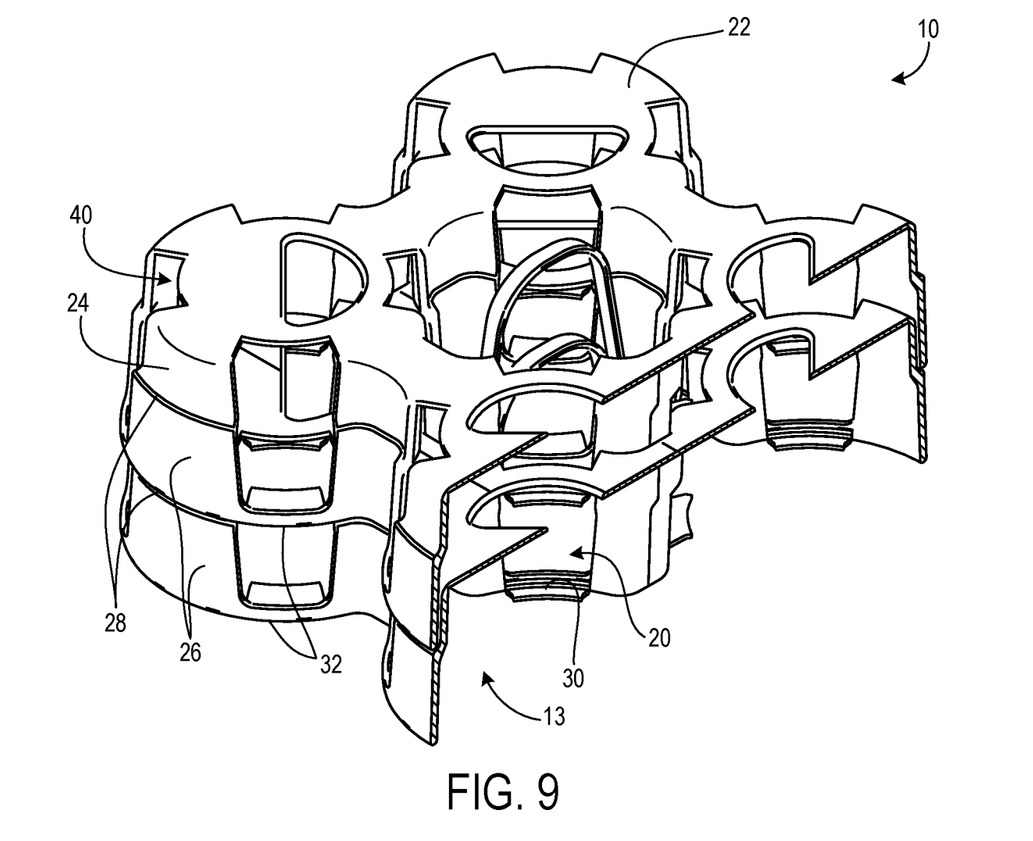
FIG. 9 shows a top perspective sectional view of the stack of two container carriers of FIG. 7.
Figure 10:
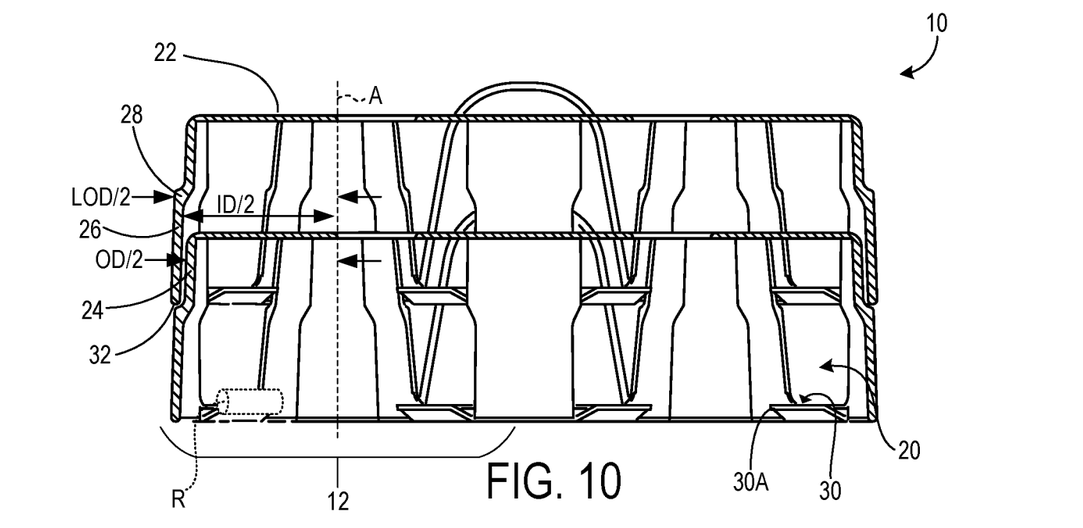
FIG. 10 shows a front sectional view of the stack of two container carriers of FIG. 7.
Figures 11A, 11B, 11C:
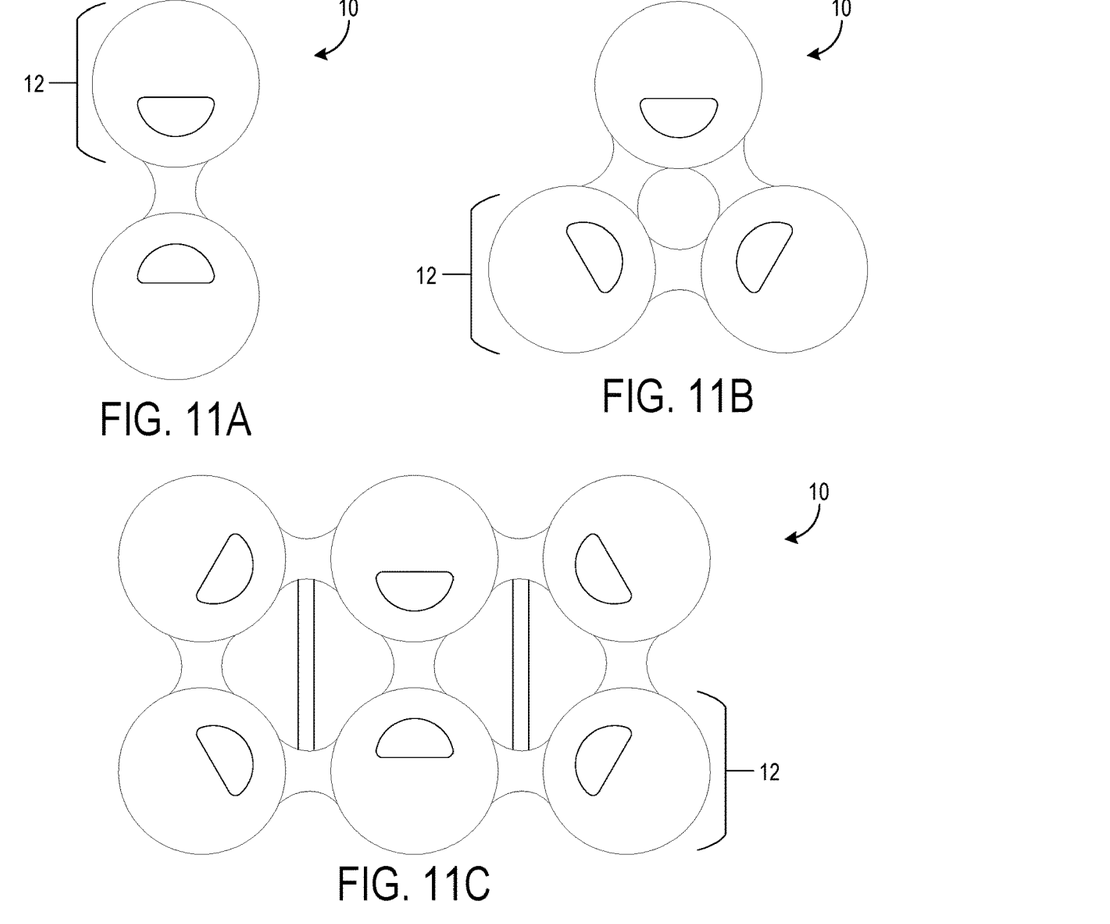
FIGS. 11A-11D show top schematic views of container carriers with two, three, six, or eight annular structures, respectively.
Figure 11D:
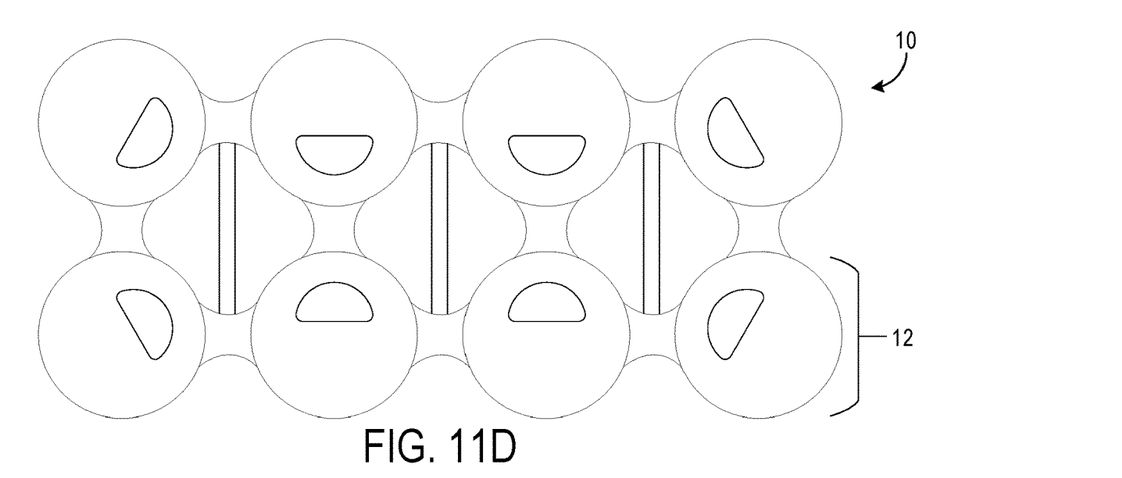

The flanges 30 may be formed to project inwardly and orient upwardly at an angle, as illustrated in FIGS. 9 and 10. The angle of inclination of the flanges from horizontal may be greater than zero and less than 45 degrees, and preferably greater than 10 and less than 30 degrees. The internal perimeters of the flanges are formed to have an arcuate shape centered on the central axis A, which conforms to a curvature of a neck N of a container CON, as shown in FIG. 5. With this configuration, the flanges 30 may flex when accepting or releasing the container CON, in contrast to current solutions in which the securing structure is a thick, rigid ledge. As the container CON is inserted, it will be appreciated that the flange flexes to allow the cap CP and lip L, both of which have a diameter larger than the internal diameter of the inner perimeter 30A (see FIGS. 3 and 4) of the flanges, but smaller than the smallest inner diameter of the side wall portion 18, to permit ingress of the cap CP and lip L into the internal void 13 in the arcuate structure 12. As the container CON is being inserted, once the cap CP and lip L are past the flanges 30, the flanges snap to their original, unflexed shape, and the lip L (or alternatively cap CP) rests on the flange 30, in the orientation shown in FIG. 5. With the containers CON so secured, a user may lift and carry the containers CON in the carrier 10 by grasping and lifting the handle 42. When it comes time to remove the container CON, the flange is sufficiently flexible that a user may easily remove the container CON from the container carrier by pulling the container cap CP and lip L past the flanges 30, causing the flanges 30 to flex downwardly during egress, with relative ease and minimal disturbance to the contents of the container, which can be important both for users with weaker grip and for beverages that should be delicately handled, such as carbonated beverages. In the illustrated embodiment, the ends of the flanges 30 are angular. Alternatively, the flanges may be configured to have rounded ends R, as depicted by the dashed lines in FIG. 10, which would facilitate their use with containers having tamper-resistant films or wraps around their caps.

Figure 3:
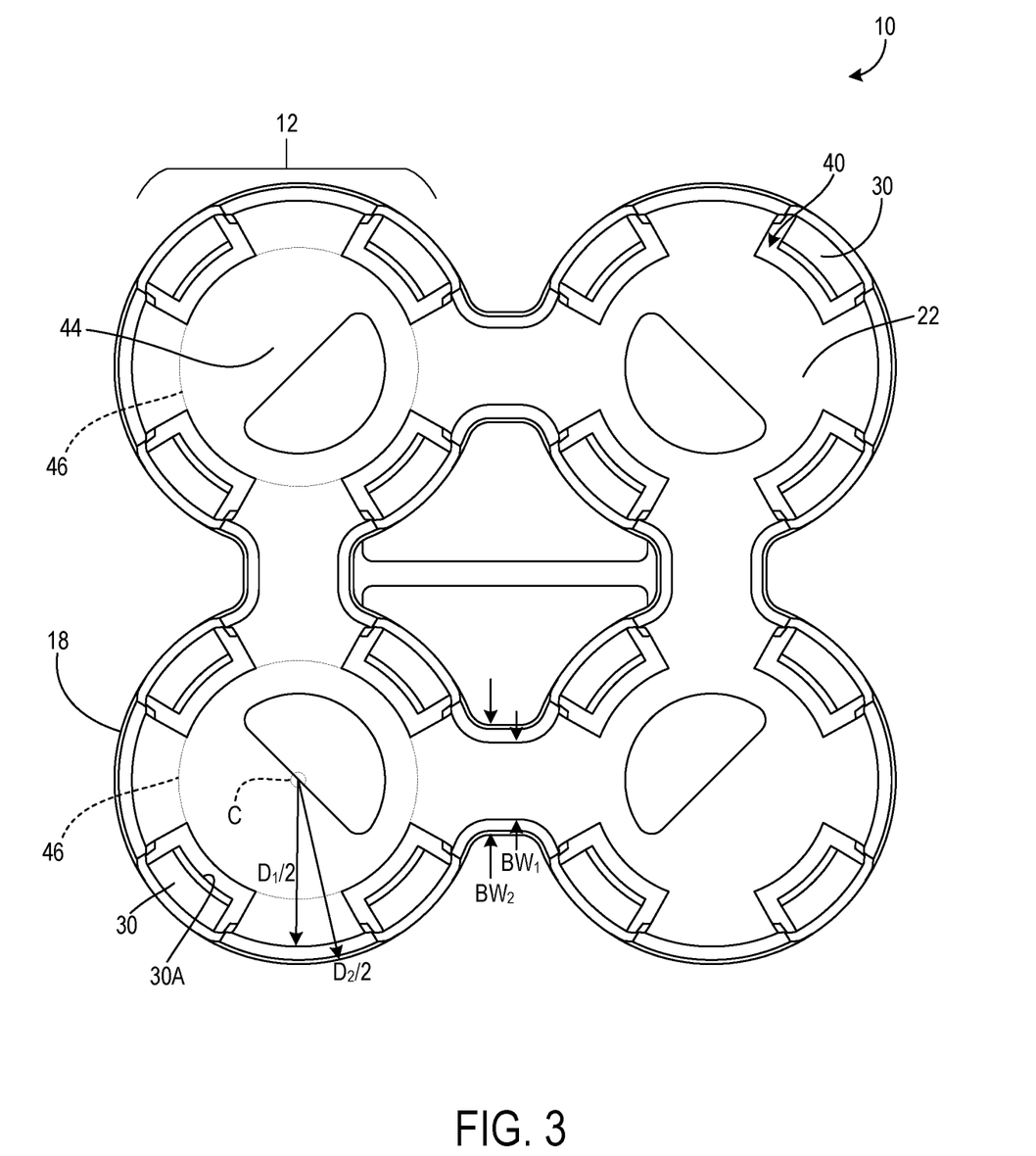
FIG. 3 shows a top view of the container carrier of FIG. 1.
Figure 4:
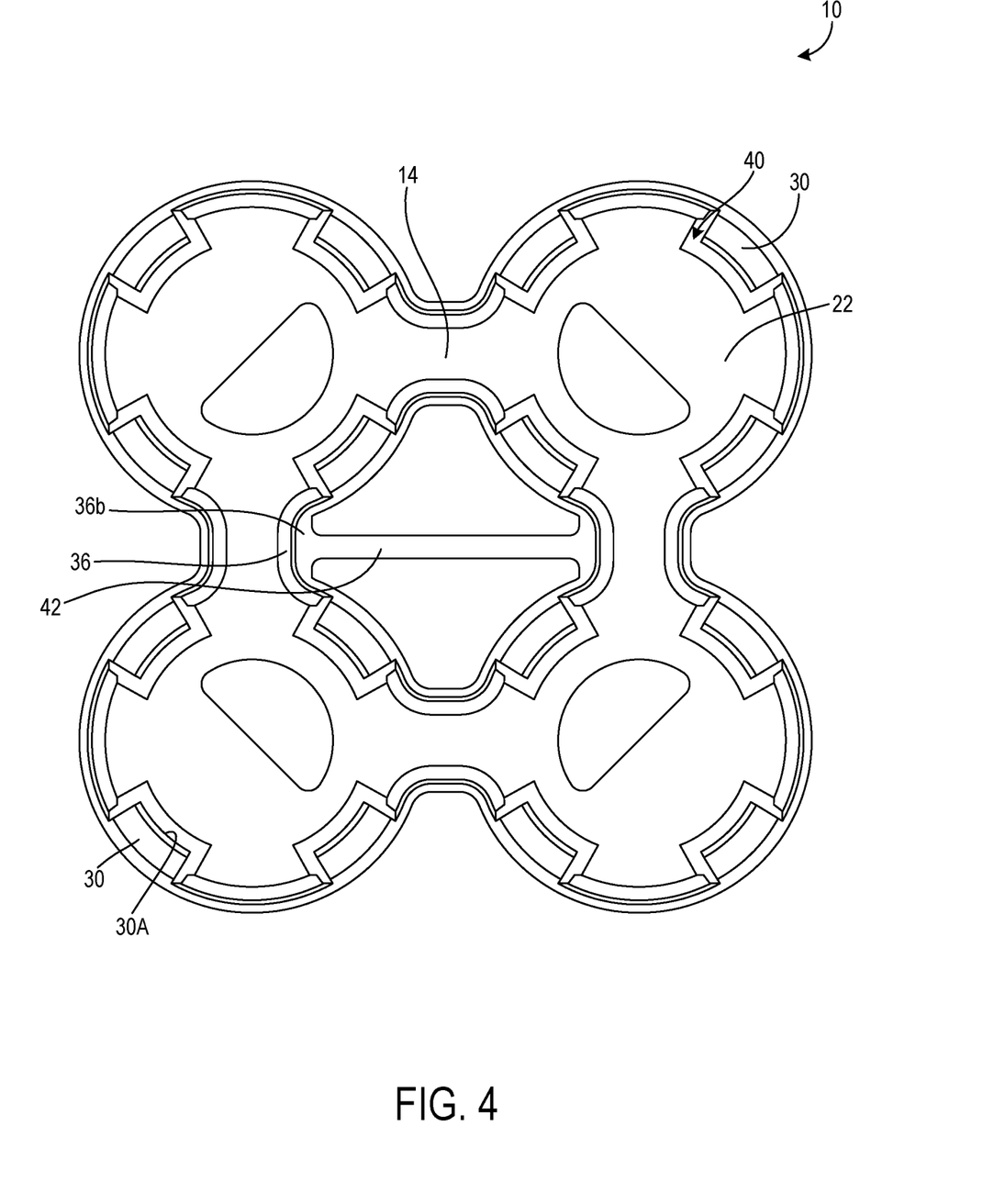
FIG. 4 shows a bottom view of the container carrier of FIG. 1.

Turning briefly to FIGS. 3 and 4, the flanges 30 may have a perimeter profile as viewed from above that is smaller and nests within a perimeter profile as viewed from above of the notched voids 40 in the top surface 22. In this configuration, the flanges 30 may be accommodated by the notched voids 40 in the top surface 22 of a second, same-shaped container carrier 10 when stacked, as illustrated in FIGS. 7-10.

As shown in FIGS. 2 and 4, each container carrier 10 may comprise an integrally formed graspable loop 42. In the illustrated configuration, the graspable loop 42 extends from the bottom of a lower side wall segment 36b of an inner side wall portion 36 of a bridge 14 to the bottom of a lower side wall segment 36b of an inner side wall portion 36 of an opposite bridge 14. Alternatively, the graspable loop 42 may be formed with the top surface 22 of an annular structure 12.

Figure 6:
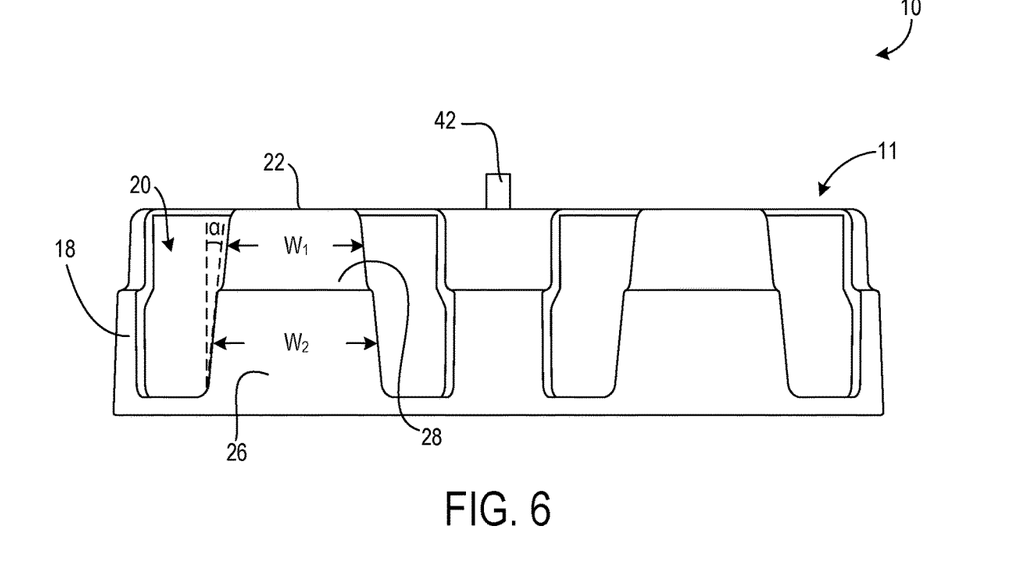
FIG. 6 shows a right view of the container carrier of FIG. 1, wherein the left view is an identical image thereof.
Figure 7:
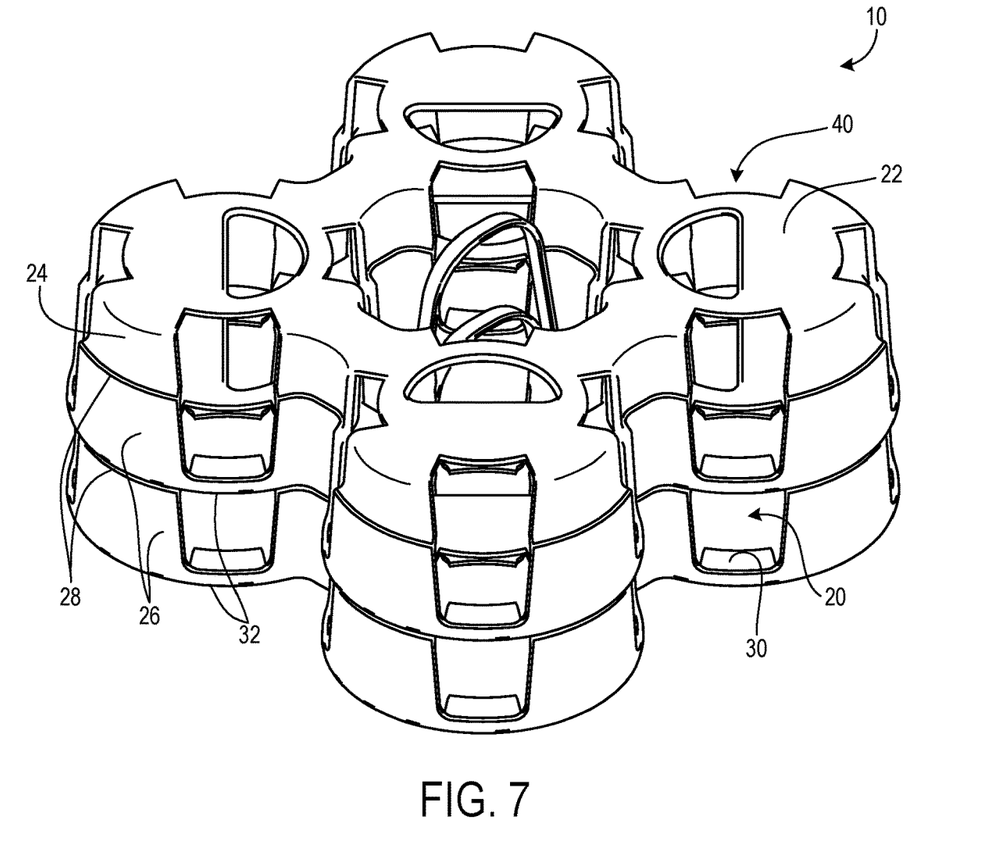
FIG. 7 shows a top perspective view of a stack of two container carriers of the type shown in FIG. 1.
Figure 8:
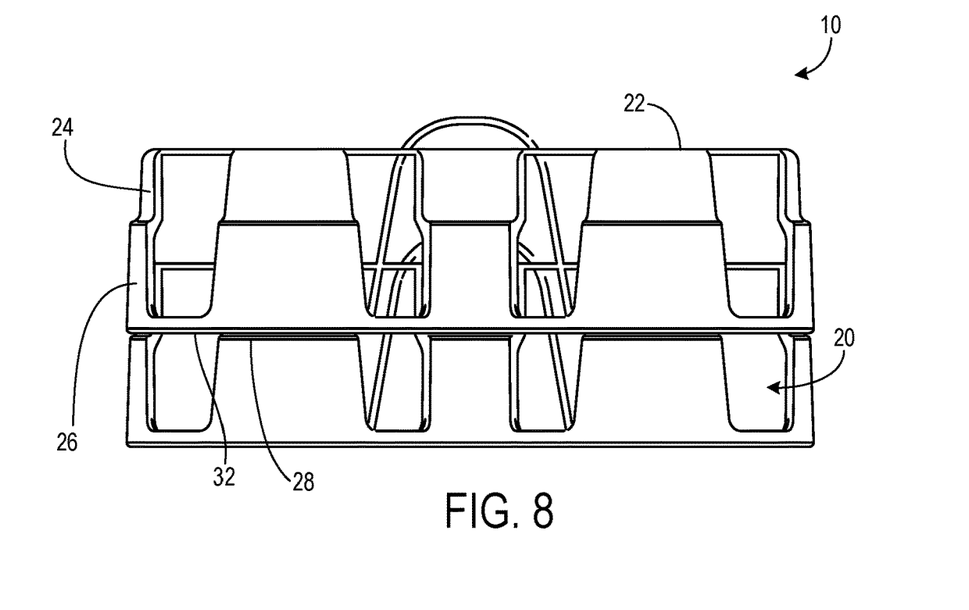
FIG. 8 shows a front view of the stack of two container carriers of FIG. 7.

The peak height of the graspable loop 42 may extend beyond the top surfaces 22 of the annular structures 12 and bridges 14 of the container carrier 10, as shown in FIGS. 5 and 6. The extended graspable loop 42 allows a user to easily grasp the container carrier 10. Alternatively, the peak height of the graspable loop may 42 be in a plane with or parallel to the top surfaces 22 of the annular structures 12 and bridges 14. In the present embodiment, the graspable loop 42 is formed in the shape of an arc, and the arc-shaped loops 42 nest together when stacked as shown in FIG. 7. Alternatively, it will be appreciated that the graspable loop 42 may be formed in an alternate stackable shape, such as an S or a flat band, and may further be configured to be flexibly attached to the container carrier to lay flat for shipping and lift up for carrying.

As shown in FIGS. 1 and 3, the top surface 22 connecting the side wall portions 18 of each annular structure 12 may have a central region 44 defined by an inner perimeter 46. This feature provides stability to the container carrier 10 and also protects the caps of the containers. In this embodiment, the central region 44 of the top surface 22 is partially open, which allows air circulation such that condensation does not form on the caps of the containers, and also reduces the weight of the container carrier 10 while at the same time providing a surface for providing indicia such as branding, legal notices, etc. Alternatively, the central region 44 of the top surface 22 may be formed to fully cover the caps of the containers secured within the container carrier 10.

FIGS. 5 and 6 are front and side views of one embodiment of a container carrier 10. As shown in FIG. 5, the height $H_2$ of the lower side wall segments 26 of the side wall portions 18 may be greater than the height $H_1$ of the upper side wall segments 28. Additionally, the side wall portions 18 may be tapered such that the upper side wall segment 28 has a smaller width $W_1$ relative to the width $W_2$ of the lower side wall segment 26, as illustrated by angle α in FIG. 6. These features allow a plurality of container carriers 10 to nest together when arranged in a stack.

Perspective, front, and sectional views of a stack of two container carriers are illustrated in FIGS. 7-10. As shown in FIG. 10, each lower side wall segment 26 may include a bottom portion 32 that is shaped to have an inner diameter ID that is larger than an outer diameter OD of the upper side wall segment 24 and smaller than an outer diameter LOD of the ledge 28 as defined along a vertical central axis A of the annular structure 12. In this configuration, the bottom portion 32 of the lower side wall segment 26 will rest upon the ledge 28 of a second, same-shaped container carrier 10 when stacked.

The embodiment of container carrier 10 depicted in FIGS. 1-10 includes four annular structures 12. However, the plurality of annular structures 12 may alternatively be one of two, three, six, or eight annular structures 12, as depicted in FIGS. 11A-11D, or other suitable number of annular structures 12. In the illustrated examples with four, six, or eight annular structures 12, each annular structure 12 is positioned orthogonal to adjacent annular structures 12. The graspable loops 42 are illustrated between each opposite pair of annular structures 12, but it will be appreciated that one or more graspable loops 42 may be alternately positioned on the body 11 of the container carrier 10. For example, a graspable loop 42 may be formed to connect the endmost bridges 14 of the container carriers 10 having six or eight annular structures 12. It may be desirable to the manufacturer or distributor of the containers secured within the container carrier 10 to offer their products in a specific number or a variety of numbers, depending on the context.

For example, certain products may be offered as a twin-pack at a typical grocery store and as a four-pack or an eight-pack at a warehouse store.

In any of the embodiments described herein, the body 11 of the container carrier 10 may be preferentially formed of a flexible plastic. Being both strong and lightweight, plastic is an advantageous material for use in container carriers. It is preferable that the plastic be flexible in nature to accommodate the releasable engagement of the containers with the flanges. Specifically, the plastic may be high density polyethylene (HDPE), and it may further be recycled HDPE. It will be appreciated that container carriers formed of flexible plastic have the additional benefit of being recyclable.

The container carriers described above may be used to provide a convenient carrying mechanism for containers of all sorts, but are particularly advantageous due to the releasable engagement of the containers by the flanges, which are formed to be flexible and oriented upward at an angle, thereby securely holding the containers but also facilitating a hassle-free release of the containers when removable from the container carrier is desired.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A container carrier for securing together and carrying multiple containers comprising:
   an integrally molded body including a plurality of annular structures, wherein
   each annular structure is connected by a bridge to at least one adjacent annular structure of the plurality of annular structures;
   each annular structure includes a side wall formed of side wall portions separated by side wall voids formed in the side wall, and a top surface connecting the side wall portions;
   the top surface of each annular structure has a central region defined by an intermediate perimeter, the central region being formed to fully cover a top of a corresponding container of the multiple containers;
   a respective flange is positioned proximate a bottom end of each side wall void;
   the flanges of each annular structure are collectively configured to releasably engage a corresponding container of the multiple containers;
   a graspable loop is integrally formed to extend from a bridge to an opposite bridge, a peak height of the graspable loop being in a plane with the top surfaces of the annular structures; and
   each side wall portion has a respective upper side wall segment that has a reduced diameter relative to a respective lower side wall segment of the side wall portion, the upper and lower side wall segments being joined at a ledge that spans a difference between respective diameters in the upper and lower side wall segments.

2. The container carrier of claim 1, wherein
a bottom portion of the lower side wall segment is shaped to have an inner diameter that is larger than an outer diameter of the upper side wall segment and smaller than an outer diameter of the ledge, so that the bottom portion of the lower side wall segment will rest upon the ledge of a second, same-shaped container carrier when stacked.

3. The container carrier of claim 1, wherein
the flanges project inwardly and are oriented upwardly at an angle;
the top surface connecting the side wall portions of each annular structure includes notched voids continuous with respective side wall voids; and
the flanges have a perimeter profile as viewed from above that is smaller and nests within a perimeter profile as viewed from above of the notched voids in the top surface, such that the flanges are accommodated by the notched voids in the top surface of a second, same-shaped container carrier when stacked.

4. The container carrier of claim 1, wherein
the graspable loop is configured to lay flat for shipping and lift up for carrying.

5. The container carrier of claim 1, wherein the ends of the flanges are rounded.

6. The container carrier of claim 1, wherein
an angle of inclination of the flanges from horizontal is in a range of zero degrees to 45 degrees.

7. The container carrier of claim 6, wherein
the angle of inclination of the flanges from horizontal is in a range of 10 degrees to 30 degrees.

8. The container carrier of claim 1, wherein
the plurality of annular structures is one of two, three, four, six, or eight annular structures.

9. The container carrier of claim 1, wherein
the container carrier is formed of a flexible plastic.

10. A manufacturing method for a container carrier for securing together and carrying multiple containers by the necks, the method comprising:
    molding an integrally formed body including a plurality of annular structures, wherein each annular structure is connected by a bridge to at least one adjacent annular structure of the plurality of annular structures;
    forming each annular structure to include a side wall formed of side wall portions separated by side wall voids formed in the side wall, and a top surface connecting the side wall portions; forming the top surface to have a central region defined by an intermediate perimeter;
    forming the central region of each top surface to fully cover a lid of a corresponding container of the multiple containers;
    forming a respective flange proximate a bottom end of each side wall void;
    forming the flanges of each annular structure to collectively and releasably engage a corresponding container of the multiple containers;
    forming a graspable loop to extend from the bridge to an opposite bridge, a peak height of the graspable loop being in a plane with the top surfaces of the annular structures; and
    forming each side wall portion to have a respective upper side wall segment with a reduced diameter relative to a respective lower side wall segment of the side wall portion, the upper and lower side wall segments being joined at a ledge that spans a difference between respective diameters in the upper and lower side wall segments.

11. The method of claim 10, the method further comprising:
    forming a bottom portion of the lower side wall segment to have an inner diameter that is larger than an outer diameter of the upper side wall and smaller than an outer diameter of the ledge, so that the bottom portion of the lower side wall segment will rest upon the ledge of a second, same-shaped container carrier when stacked.

12. The method of claim 10, the method further comprising:
    forming the flanges to project inwardly and be oriented upwardly at an angle;
    forming the top surface that connects the side wall portions of each annular structure to include notched voids continuous with respective side wall voids; and
    forming the flanges to have a perimeter profile as viewed from above that is smaller and nests within a perimeter profile as viewed from above of the notched voids in the top surface, such that the flanges are accommodated by the notched voids in the top surface of a second, same-shaped container carrier when stacked.

13. The method of claim 10, the method further comprising:
    forming the graspable loop to be flexibly attached to the container carrier to lay flat for shipping and lift up for carrying.

14. The method of claim 10, the method further comprising:
    forming the ends of the flanges to be rounded.

15. The method of claim 10, wherein
    an angle of inclination of the flanges from horizontal is in a range of zero degrees to 45 degrees.

16. The method of claim 15, wherein
    the angle of inclination of the flanges from horizontal is in a range of 10 degrees to 30 degrees.

17. The method of claim 10, wherein
    the plurality of annular structures is one of two, three, four, six, or eight annular structures.

18. The method of claim 10, wherein
    the container carrier is formed of a flexible plastic.

* * * * *